United States Patent
Gramsamer et al.

(10) Patent No.: US 6,929,396 B2
(45) Date of Patent: Aug. 16, 2005

(54) SYSTEM FOR TEMPERATURE MONITORING

(75) Inventors: Franz Gramsamer, Fridolfing (DE); Erwin Bratzdrum, Hallabruck (DE); Robert Wastlhuber, Garching/Alz (DE); Udo Ollert, Kirchweidach (DE)

(73) Assignee: Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/690,895

(22) Filed: Oct. 22, 2003

(65) Prior Publication Data

US 2004/0091017 A1 May 13, 2004

(30) Foreign Application Priority Data

Oct. 22, 2002 (DE) .......................................... 102 49 041

(51) Int. Cl.[7] .......................... G01K 13/00; G01K 7/24; G08C 19/04
(52) U.S. Cl. ...................... 374/152; 374/142; 374/183; 340/870.31; 318/473; 361/25
(58) Field of Search ................................ 374/152, 142, 374/141, 163, 183–185; 340/870.17, 870.3, 870.31; 318/798, 471–473; 361/24, 25, 27

(56) References Cited

U.S. PATENT DOCUMENTS

| | | | | | |
|---|---|---|---|---|---|
| 2,717,945 | A | * | 9/1955 | Briggs et al. | 374/185 |
| 3,728,565 | A | * | 4/1973 | O'Callaghan | 310/168 |
| 4,041,541 | A | * | 8/1977 | Frossard et al. | 361/27 |
| 4,140,999 | A | * | 2/1979 | Conway | 340/870.11 |
| 4,150,358 | A | * | 4/1979 | Aviander | 340/870.31 |
| 4,721,894 | A | * | 1/1988 | Graber | 361/27 |
| 4,858,481 | A | * | 8/1989 | Abraham | 318/473 |
| 5,142,280 | A | * | 8/1992 | Lehle | 340/870.31 |
| 6,028,382 | A | * | 2/2000 | Blalock et al. | 361/25 |
| 6,142,741 | A | * | 11/2000 | Nishihata et al. | 361/24 |
| 6,529,135 | B1 | * | 3/2003 | Bowers et al. | 340/648 |

FOREIGN PATENT DOCUMENTS

JP          8-261792      10/1996

\* cited by examiner

*Primary Examiner*—Gail Verbitsky
*Assistant Examiner*—Stanley J. Pruchnic, Jr.
(74) *Attorney, Agent, or Firm*—Kenyon & Kenyon

(57) ABSTRACT

A system for monitoring the temperature prevailing in the stator unit of an electric drive includes a temperature sensor that is integrated into the windings of the stator unit and that transmits a temperature-dependent sensor signal. The sensor signal may be injected via an electrical transmitter unit into the signal processing unit of a position measuring device connected to the drive.

13 Claims, 3 Drawing Sheets

SYSTEM FOR TEMPERATURE MONITORING

CROSS-REFERENCE TO RELATED APPLICATIONS

The present application claims priority to Application No. 102 49 041.4, filed in the Federal Republic of Germany on Oct. 22, 2002, which is expressly incorporated herein in its entirety by reference thereto.

FIELD OF THE INVENTION

The present invention relates to a system for monitoring the temperature prevailing in the stator unit of an electric drive.

BACKGROUND INFORMATION

In modern electric drives, monitoring of the winding temperature on the stator unit is generally provided for safety reasons. In this manner, subsequent electronics or, if needed, an emergency shutdown, can be initiated in the event of overheating. The particular temperature data detected by a temperature sensor situated in the stator unit is often transmitted via a position measuring device, a rotary encoder, for example, which is situated on the drive. The position measuring device transmits to the sequential electronics not only the detected position data for further processing, but also the temperature data and possibly other data. Reference may be made to Japanese Published Patent Application No. 8-261792 in this regard. In particular in the case of serial data transmission for sequential electronics, the particular temperature is determined directly from the output signals sent by the temperature sensor in a signal processing unit of the position measuring device or in the sensor electronics. However, because of the normally high motor currents in the region of the stator unit, significant interference effects on the signal processing unit or sensor electronics result. Since the signal processing unit is also used for further processing of position-dependent signals, such interference also adversely affects the processing of the position data in the position measuring device. Such interference effects can be minimized only using a relatively high expenditure of resources, for example, by suitable interference suppression measures.

It is an aspect of the present invention to provide a system for monitoring the temperature in the stator unit of an electric drive which may ensure accurate temperature determination with the smallest possible expenditure of resources. The least possible interference of other sensor systems on the drive may result, in particular, of a position measuring device situated on the drive.

SUMMARY

The above and other beneficial aspects of the present invention may be achieved by providing a system as described herein.

Example embodiments of the system according to the present invention for temperature monitoring are described herein.

An example embodiment of the present invention may provide for electric isolation of the actual temperature sensor from the electronics of the position measuring device, in particular of the signal processing unit itself. This may be achieved by providing an electrical transmitter unit via which the temperature-dependent sensor signals from the temperature sensor which is integrated into the stator unit are injected into the signal processing unit or electronics of the position measuring device for further processing.

Use of the transmitter unit may ensure good suppression of interference effects, in particular common-mode interference, on the sensor electronics or signal processing unit of the position measuring device. Sufficient insulation between the electrical circuit of the temperature sensor and the processing unit of the position measuring device may be ensured.

With respect to the actual design of the transmitter unit, there may be many different types of arrangement possibilities, depending on the application.

In an example embodiment of the present invention, a system for monitoring a temperature prevailing in a stator unit of an electric drive includes a position measurement device connected to the drive including a signal processor unit, an electrical transmitter unit, and a temperature sensor integrated into windings of the stator unit and configured to deliver a temperature-dependent sensor signal. The electrical transmitter unit is configured to input the sensor signal into the signal processor unit.

The temperature sensor may include a temperature-dependent resistor integrated into the windings of the stator unit. The electrical transmitter unit may include at least two inductively coupled coils, a first one of the coils associated with the signal processor unit, and a second one of the coils associated with the temperature sensor. The first one of the coils may be arranged to be acted on by activation signals via the electrical transmitter unit to detect the temperature-dependent sensor signal. The electrical transmitter unit may include at least one measuring shunt having a constant resistance value.

The system may include an arrangement configured to generate a sinusoidal alternating excitation signal and a voltage divider circuit. The voltage divider circuit, the measuring shunt and a temperature-dependent resistance of the temperature sensor transformed by the transmitter unit may be adapted to detect the temperature-dependent sensor signal.

The system may include an arrangement configured to generate a pulsed excitation signal and a voltage divider circuit. The voltage divider circuit, the measuring shunt and a temperature dependent resistance of the temperature sensor transformed by the transmitter unit may be adapted to detect the temperature-dependent sensor signal.

The transmitter unit may include an oscillator circuit, and the system may include an arrangement configured to determine a frequency of a periodic reply signal to detect the temperature-dependent sensor signal.

The signal processor unit may include an arrangement configured to determine the temperature in accordance with the sensor signals, and the signal processor unit may include a signal transmitter configured to transmit at least temperature data to a subsequent electronic device. The signal transmitter may be configured for serial data transmission to the sequential electronic device.

The system may include means for generating one of a sinusoidal alternating excitation signal and a pulsed excitation signal and a voltage divider circuit. The voltage divider circuit, the measuring shunt and a temperature-dependent resistance of the temperature sensor transformed by the transmitter unit may be adapted to detect the temperature-dependent sensor signal.

The transmitter unit may include an oscillator circuit, and the system may include means for determining a frequency of a periodic reply signal to detect the temperature-dependent sensor signal.

The signal processor may include means for determining the temperature in accordance with the sensor signals.

In an example embodiment of the present invention, a system for monitoring a temperature prevailing in a stator unit of an electronic drive includes position measuring means connected to the drive including signal processing means, electrical transmitting means, and temperature sensing means integrated into windings of the stator unit for delivering a temperature-dependent sensor signal. The electrical transmitting means is for inputting the sensor signal into the signal processing means.

Additional aspects and details of the present invention result from the following description of exemplary embodiments, with reference to the accompanying Figures.

BRIEF DESCRIPTION OF THE DRAWINGS

FIG. 2b is a signal diagram for explaining the signal processing in the transmitter unit variant illustrated in FIG. 2a.

FIG. 3b is a signal diagram for explaining the signal processing in the transmitter unit variant illustrated in FIG. 3a.

FIG. 4b is a signal diagram for explaining the signal processing in the transmitter unit variant illustrated in FIG. 4a.

DETAILED DESCRIPTION

Figure 1:
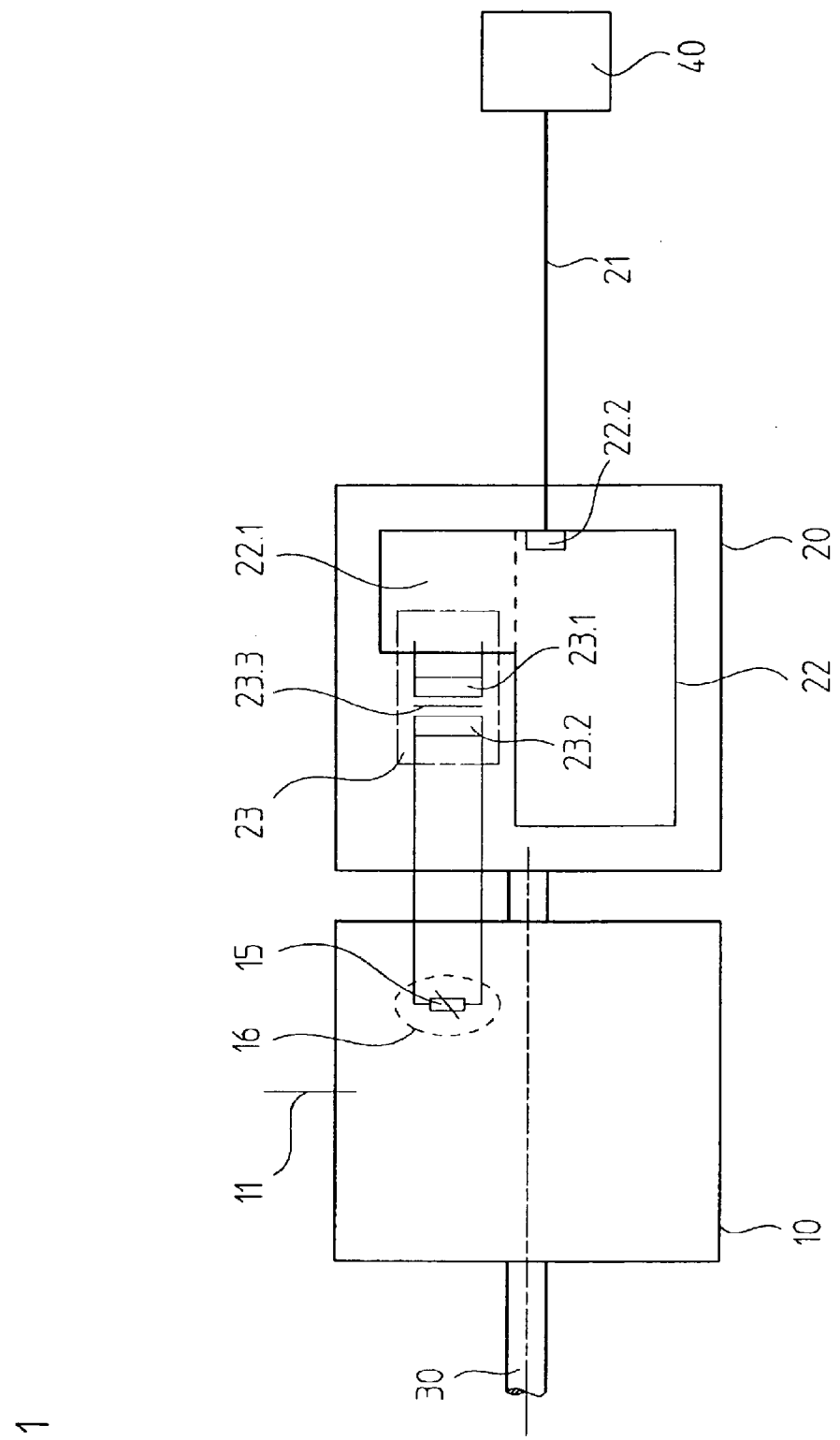
FIG. 1 is a schematic block diagram of the system according to an example embodiment of the present invention.

FIG. 1 illustrates an exemplary embodiment of the system according to the present invention in schematic form. The stator unit of an electric drive, an asynchronous motor, for example, is designated by reference number 10 in this illustration. A cable 11 which supplies power to the drive is indicated only schematically. A position measuring device 20 designed as a rotary encoder is connected to the drive via a shaft 30. Position measuring device 20 is used primarily to generate position-dependent output signals or position data with respect to the shaft rotation. The position-dependent output signals are transmitted via a signal transmission line 21, e.g., in serial form, to subsequent electronics 40 for further processing. Sequential electronics 40 may be a drive control, for example.

Generation of position-dependent output signals by position measuring device 20 is not discussed in further detail here. This may be achieved by conventional methods using optical, magnetic, inductive, capacitive, etc. scanning of a measuring graduation or code disc which rotates with shaft 30. The generated position-dependent output signals may etc. In the illustration, in FIG. 1, in addition to the position measuring device, a signal processing unit 22 is also indicated by which, among other functions, the processing of position data, for example the extraction of absolute position data, interpolation, etc., and the conditioning of data to be transmitted to sequential electronics 40 are performed. With regard to additional functions of signal processing unit 22 in connection with temperature monitoring of stator unit 10, reference is made to the following description.

As previously indicated, the system according to the present invention provides for monitoring of the temperature of windings in stator unit 10 of the drive, and transmission of corresponding temperature-dependent sensor signals, via signal transmission line 21, for further processing by subsequent electronics 40. In this manner an emergency shutdown, for example, may be initiated by sequential electronics 40 in the case of overheating. In addition, the temperature-dependent sensor signals from sequential electronics 40 may be used for other control purposes, e.g., for prevention of unacceptably high operating temperatures in the drive windings, etc.

The temperature-dependent sensor signals are actually generated in the stator unit 10 of the drive via a temperature sensor 15. Temperature sensor 15 may be arranged as a temperature-dependent resistor, for example as a semiconducting resistor having positive temperature coefficients, as marketed under model number KTY 84 by Philips. Temperature sensor 15 may be integrated into the windings of stator unit 10 by conventional methods, for example, in an open winding on the end face of the stator. Temperature sensor 15 is electrically insulated from the drive winding by schematically indicated insulation 16.

According to an example embodiment of the present invention, an electrical transmitter unit 23 is provided by which the temperature-dependent sensor signals generated from temperature sensor 15 are injected into signal processing unit 22 of position measuring device 20, to be further processed there and transmitted to sequential electronics 40 via signal transmission line 21. As can be seen in the schematic illustration of transmitter unit 23 in FIG. 1, transmitter unit 23 essentially includes two inductively coupled coils 23.1, 23.2. A first coil 23.1 is associated with signal processing unit 22, and a second coil 23.2 is associated with temperature sensor 15 in stator unit 10. Transmitter unit 23 may optionally have a core 23.3 as well. Further details of example embodiments of suitable electrical transmitter units 23 are presented in the following description of remaining FIGS. 2a through 4b.

Electrical transmitter unit 23 may ensure electrical isolation between signal processing unit 22 on position measuring device 20 and the electrical circuit of temperature sensor 15. Any interference effects of temperature sensor 15 on signal processing unit 22 of position measuring device 20, such as high common-mode currents in the wiring of temperature sensor 15, may be minimized in this manner. The use of transmitter unit 23 may guarantee the power supply to temperature sensor 15.

In addition, device 22.1 for determining the temperature based on the injected sensor signals are indicated in schematic form in FIG. 1 in addition to signal processing unit 22. Device 22.1 may be a microprocessor, for example. In addition, signal processing unit 22 (indicated only schematically) has signal transmission device 22.2 by which the temperature data, as well as other data such as position data, are transmitted to the subsequent electronics. Signal transmission device 22.2 may be adapted for serial data transmission to sequential electronics 40 via signal transmission line 21.

In principle, the particular variants of suitable transmitter units have possibilities for generating an excitation signal and for detecting the temperature-dependent sensor signal. Example embodiment possibilities of suitable transmitter units are explained with reference to subsequent FIGS. 2a through 4b.

Figure 2A:
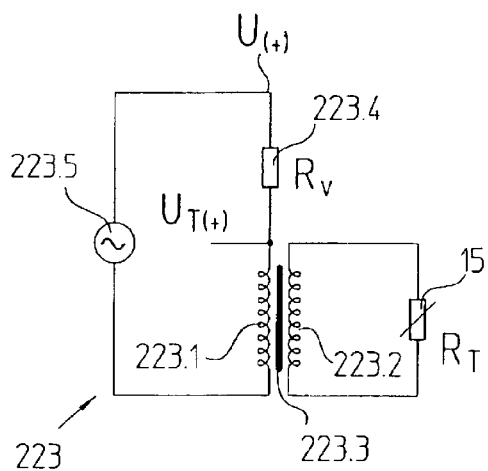
FIG. 2a is a schematic block diagram for explaining a first variant of a suitable transmitter unit.

FIG. 2a shows a first variant of an example embodiment of a suitable electrical transmitter unit 223. A sinusoidal alternating signal, a sinusoidal current signal or voltage signal U(t), for example, is used as the excitation signal which is generated by a suitable alternating signal source 223.5 in the form of a current or voltage source, and which supplies power to first coil 223.1 in a first section of transmitter unit 223. Second coil 223.2 and temperature sensor 15 are arranged in the second, electrically isolated section of transmitter unit 223. The first and second coils are coupled via a core 223.3, as shown in FIG. 1. A measuring shunt 223.4 (resistance value $R_M$) is indicated in the first section of transmitter unit 223 which represents the first resistor of a known voltage divider circuit. The transformed resistance of temperature sensor 15 (resistance value $R_T$) functions as the second resistor of the voltage divider circuit. The particular resistance value $R_T$ of temperature sensor 15 is transformed according to the known transmission ratio of transmitter unit 223. The unknown resistance of temperature sensor 15—and therefore the temperature itself—may thus be determined in, e.g., a conventional manner, using the known, constant measuring shunt 223.4, taking into account the distortion by transmitter unit Measured voltage signal $U_T(t)$ picked up via the transformed resistance of temperature sensor 15 functions as the measurement variable.

Figure 2B:
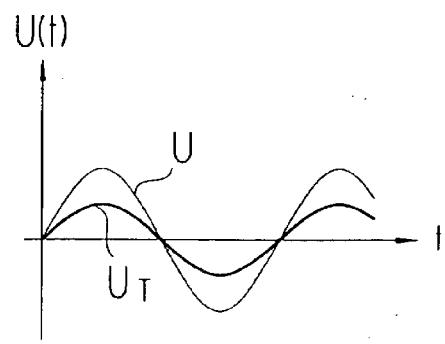

FIG. 2b illustrates the sinusoidal excitation signal in the form of sinusoidal voltage signal U(t) in addition to measured voltage $U_T(t)$ picked up by transformed temperature sensor 15, from which it is possible to obtain, e.g., by conventional methods, the temperature information of interest regarding temperature sensor 15.

Figure 3A:
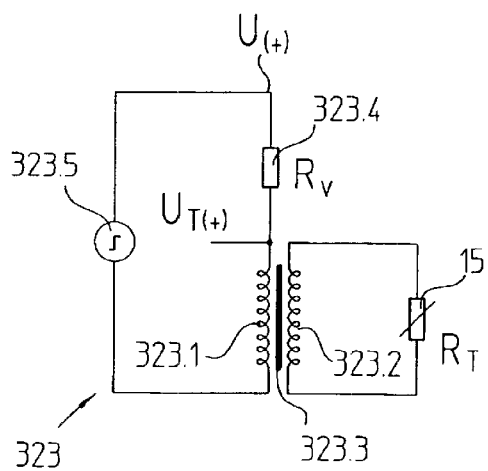
FIG. 3a is a schematic block diagram for explaining a second variant of a suitable transmitter unit.
Figure 3B:
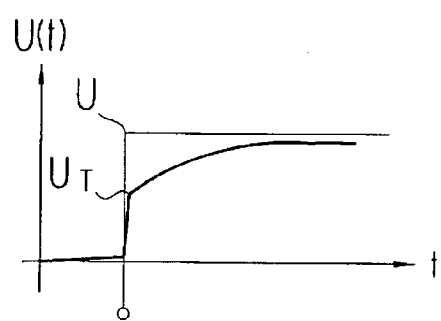

A second example embodiment of a suitable transmitter unit 323 is shown in schematic form in FIG. 3a. A pulsed excitation signal U(t), for example in the form of a suitable current or voltage pulse which is generated from a suitable pulsed signal source 323.5, is used as the excitation signal. First coil 323.1 is acted on by pulsed excitation signal U(t) in the first section of transmitter unit 323. Second coil 323.2 and temperature sensor 15, in the form of a temperature-dependent resistor, are arranged in the second section of transmitter unit 323. As in the previous example, both coils 323.1, 323.2 are coupled via a core 323.3. The actual temperature-dependent sensor signal $U_T(t)$ is detected as the response to applied excitation signal U(t) via measuring shunt 323.4 arranged in the first section of transmitter unit 323. Temperature sensor 15 or the corresponding temperature-dependent resistor used for this purpose is thus a component of a voltage divider in this example. Value $U_T(t)$ of the sensor signal, which results and is measured immediately after application of voltage pulse U(t), is a direct measure of the resistance to be determined, and thus of the temperature to be determined in the drive winding. With regard to the signal variation by applied voltage pulse U(t) and value $U_T(t)$ of the sensor signal determined via the measuring shunt, reference is made to FIG. 3b.

Figure 4A:
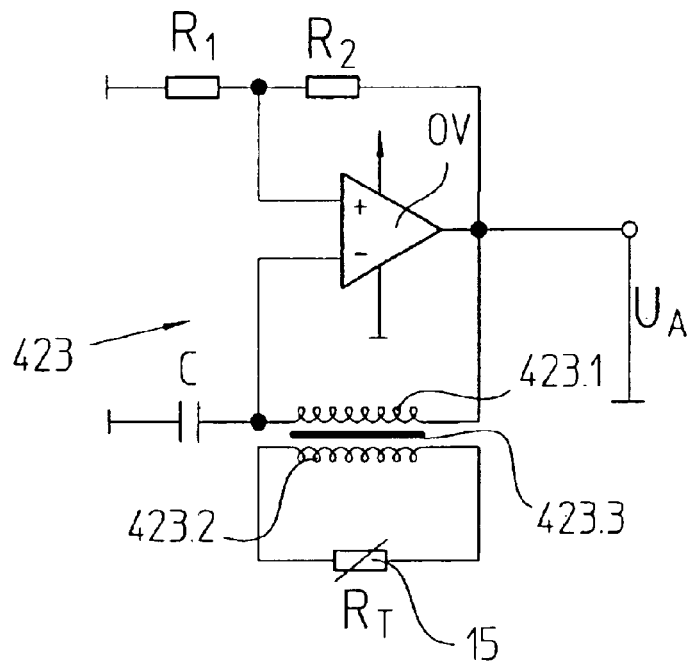
FIG. 4a is a schematic block diagram for explaining a third suitable transmitter unit variant.
Figure 4B:
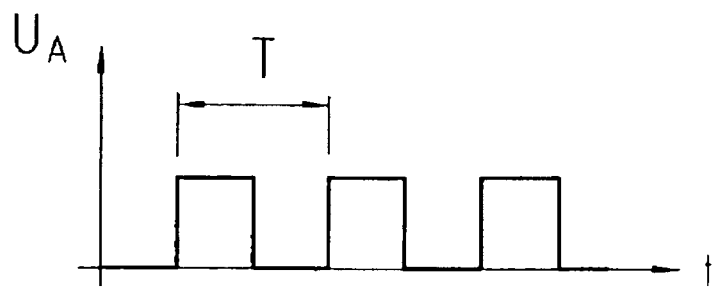

A third example embodiment of a transmitter unit 423 is explained with reference to FIGS. 4a and 4b. To generate a periodic excitation signal, an oscillator circuit is provided in this example embodiment which may be arranged as a multivibrator, for example, and which has the design illustrated in FIG. 4a. The second section of transmitter unit 423 may have an identical design to the variant explained in the previous examples, and essentially includes second coil 423.2 and temperature sensor 15 in the form of a temperature-dependent resistor. In addition to first coil 423.1, the referenced oscillator circuit is arranged in the first section of transmitter unit 423, which is coupled to the second section via a core 423.3. The oscillator circuit includes, among other components, a capacitor C, an operational amplifier OV, and two resistors $R_1$, $R_2$.

The resistance of temperature sensor 15 to be measured forms an additional component of the resulting oscillator, and represents the frequency-determining element of the oscillator. Frequency f generated by the oscillator is thus a measure of the resistance to be determined, and may be determined from measured signal $U_A(t)$, as illustrated in FIG. 4b. The temperature of interest in the drive winding once results, e.g., in a conventional manner, from the determined resistance, it being understood that the component tolerances which influence frequency f may also be taken into account.

In addition to the described variants for producing suitable transmitter units, there are other alternative embodiment possibilities within the scope of the present invention.

What is claimed is:

1. A system for monitoring a temperature prevailing in a stator unit of an electric drive, comprising:

a position measurement device connected to the drive including a signal processor unit;

an electrical transmitter unit; and a temperature sensor integrated into windings of the stator unit and configured to deliver a temperature-dependent sensor signal, the electrical transmitter unit configured to input the sensor signal into the signal processor unit;

wherein the temperature sensor includes a temperature-dependent resistor integrated into the windings of the stator unit; and wherein the electrical transmitter unit includes at least two inductively coupled coils, a first one of the coils associated with the signal processor unit, a second one of the coils associated with the temperature sensor.

2. The system according to claim 1, wherein the first one of the coils is arranged to be acted on by activation signals via the electrical transmitter unit to detect the temperature-dependent sensor signal.

3. The system according to claim 2, wherein the transmitter unit includes an oscillator circuit, the system further comprising an arrangement configured to determine a frequency of a periodic reply signal to detect the temperature-dependent sensor signal.

4. The system according to claim 2, wherein the transmitter unit includes an oscillator circuit, the system further comprising means for determining a frequency of a periodic reply signal to detect the temperature-dependent sensor signal.

5. The system according to claim 1, wherein the signal processor unit includes an arrangement configured to determine the temperature in accordance with the sensor signals.

6. The system according to claim 5, wherein the signal processor unit includes a signal transmitter configured to transmit at least temperature data to a subsequent electronic device.

7. The system according to claim 6, wherein the signal transmitter is configured for serial data transmission to the sequential electronic device.

8. The system according to claim 1, wherein the signal processor includes means for determining the temperature in accordance with the sensor signals.

9. The system according to claim 1, wherein the electrical transmitter unit is configured to supply power to the temperature sensor.

10. A system for monitoring a temperature prevailing in a stator unit of an electric drive, comprising:
- a position measurement device connected to the drive including a signal processor unit;
- an electrical transmitter unit; and
- a temperature sensor integrated into windings of the stator unit and configured to deliver a temperature-dependent sensor signal, the electrical transmitter unit configured to input the sensor signal into the signal processor unit;
- wherein the temperature sensor includes a temperature-dependent resistor integrated into the windings of the stator unit;
- wherein the electrical transmitter unit includes at least two inductively coupled coils, a first one of the coils associated with the signal processor unit, a second one of the coils associated with the temperature sensor;
- wherein the first one of the coils is arranged to be acted on by activation signals via the electrical transmitter unit to detect the temperature-dependent sensor signal; and
- wherein the electrical transmitter unit includes at least one measuring shunt having a constant resistance value.

11. The system according to claim 10, further comprising:

an arrangement configured to generate a sinusoidal alternating excitation signal; and a voltage divider circuit, the voltage divider circuit, the measuring shunt and a temperature-dependent resistance of the temperature sensor transformed by the transmitter unit adapted to detect the temperature-dependent sensor signal.

12. The system according to claim 10, further comprising:

an arrangement configured to generate a pulsed excitation signal; and a voltage divider circuit, the voltage divider circuit, the measuring shunt and a temperature dependent resistance of the temperature sensor transformed by the transmitter unit adapted to detect the temperature-dependent sensor signal.

13. The system according to claim 10, further comprising:

means for generating one of a sinusoidal alternating excitation signal and a pulsed excitation signal; and a voltage divider circuit, the voltage divider circuit, the measuring shunt and a temperature-dependent resistance of the temperature sensor transformed by the transmitter unit adapted to detect the temperature-dependent sensor signal.

* * * * *

UNITED STATES PATENT AND TRADEMARK OFFICE
CERTIFICATE OF CORRECTION

PATENT NO. : 6,929,396 B2
DATED : August 16, 2005
INVENTOR(S) : Franz Gramsamer et al.

It is certified that error appears in the above-identified patent and that said Letters Patent is hereby corrected as shown below:

Title page,
Item [73], Assignee, change "Johannes Heidenhain GmbH," to -- Dr. Johannes Heidenhain GmbH, --.

Column 5,
Line 23, change "transmitter unit Measured" to -- transmitter unit 223. Measured --.

Signed and Sealed this

First Day of November, 2005

JON W. DUDAS
*Director of the United States Patent and Trademark Office*